(12) United States Patent  
Genthon et al.

(10) Patent No.: US 9,232,609 B2
(45) Date of Patent: Jan. 5, 2016

(54) PORTABLE ELECTRIC LAMP HAVING AN ANTI GLARE SYSTEM

(71) Applicant: Zedel S.A., Crolles (FR)

(72) Inventors: Fabien Genthon, Crolles (FR); Romain Pellat-Finet, Grenoble (FR)

(73) Assignee: Zedel S.A., Crolles (FR)

( * ) Notice: Subject to any disclaimer, the term of this patent is extended or adjusted under 35 U.S.C. 154(b) by 77 days.

(21) Appl. No.: 14/023,826

(22) Filed: Sep. 11, 2013

(65) Prior Publication Data

US 2014/0070699 A1   Mar. 13, 2014

(30) Foreign Application Priority Data

Sep. 11, 2012   (FR) ...................................... 12 02418

(51) Int. Cl.
  H05B 37/02   (2006.01)
  A42B 3/04    (2006.01)
  H05B 33/08   (2006.01)
  B60Q 1/14    (2006.01)

(52) U.S. Cl.
  CPC .............. *H05B 37/02* (2013.01); *B60Q 1/1423* (2013.01); *H05B 33/0845* (2013.01); *H05B 33/0854* (2013.01); *H05B 37/0272* (2013.01)

(58) Field of Classification Search
  None
  See application file for complete search history.

(56) References Cited

U.S. PATENT DOCUMENTS

| | | | |
|---|---|---|---|
| 6,095,661 A | 8/2000 | Lebens et al. | |
| 7,410,271 B1 | 8/2008 | Man | |
| 8,378,587 B2 | 2/2013 | Huguenin et al. | |
| 8,529,086 B2 | 9/2013 | Skrivan et al. | |
| 2011/0031901 A1 | 2/2011 | Huguenin et al. | |
| 2012/0206050 A1* | 8/2012 | Spero | 315/152 |
| 2013/0214998 A1* | 8/2013 | Andes et al. | 345/8 |

FOREIGN PATENT DOCUMENTS

| | | |
|---|---|---|
| FR | 2930706 | 10/2009 |
| WO | WO 03089838 | 10/2003 |
| WO | WO 2009133309 | 11/2009 |

OTHER PUBLICATIONS

French Search Report Mailed: Jan. 25, 2013.

* cited by examiner

*Primary Examiner* — Douglas W Owens
*Assistant Examiner* — Dedei K Hammond
(74) *Attorney, Agent, or Firm* — Saile Ackerman LLC; Stephen B. Ackerman

(57) ABSTRACT

A portable lamp comprising:
Communication means for exchanging identification data, configuration settings or control instructions with another portable lamp.
More specifically, the communication means are used for avoiding exposition to glare.

14 Claims, 5 Drawing Sheets

PORTABLE ELECTRIC LAMP HAVING AN ANTI GLARE SYSTEM

TECHNICAL FIELD

The present invention relates to the field of portable electric lamps and in particular to a portable electric lamp fitted with an anti-glare system.

BACKGROUND

The Applicant of the present application has marketed a portable lamp, of the type headlamp, with a so-called "reactive" or "dynamic" lighting which is described in patent application WO2009/133309. Briefly, in the prior art as illustrated in FIG. 1, there is a headlamp having at least one light emitting diode 11 and a LED type optical sensor 14 located in the vicinity and for sensing a signal representative of the light reflected by the surface of an object illuminated by the lamp 16. A control circuit 13 processes the signal for the purpose of automatically controlling the power of the LED according to a predetermined threshold. In this way, an automatic adjustment of the light beam emitted by the lamp can be achieved without any manual action to adapt the light to the environment, while managing energy consumption.

The principle of this light "dynamic" is clearly a significant improvement brought in field of headlamps, and more generally portable lighting, in particular since it allows to constantly adapt the lighting to the illumination needs.

However, this lamp does not eliminate the problem of glare exposure of an interlocutor facing the headlamp holder.

A solution to this problem is described in two patent applications PCT/EP2012/000982 and PCT/EP2012/000984, both filed Mar. 6, 2012 by the Applicant of this patent application and unpublished at the time of filing this application. This solution requires the use of an image sensor associated to a image processor which can process images so as to achieve the recognition of a human face, and in particular an eye, so as to automatically reduce the brightness when the lighting conditions expose a person to a dangerous glare.

Such a solution requires a sophisticated architecture, based on a microprocessor fitted with digital processing capabilities, and unfortunately remains reserved for the most expensive lamps.

SUMMARY

It is desirable, therefore, to be able to provide for all portable lamps and not just the most expensive lamps, a security system that is capable of removing, or at least to significantly reduce the risk of glare.

It is an object of the present invention to provide a low costs headlamp equipped with an advanced control mechanism so as to avoid or at least significantly reduce the phenomenon of glare which can be very dangerous for a human eye.

It is another object of the present invention to provide an improved method for controlling the light intensity of a headlamp capable of communicating with other portable or headlamps, and to bring new functionalities to its user.

It is another object of the present invention is to provide a headlamp having new functionalities, including communication means can be used in many applications.

The invention achieves these goals by means of a portable lamp including communication means, in particular an infrared channel that is distinct from the light channel, so as to exchange, with another portable lamp, identification data, configuration parameters or control instructions.

Preferably, the lamp comprises:
at least one light source for generating at least one light beam;
means for controlling the brightness in response to control information generated by a control unit.

The control unit includes a sensor generating a signal representative of reflected light and signal processing means for generating the control information.

The light source may be kind of bulb (halogen) or, preferably, a light source of the type LED, OLED etc. . . .

More specifically, the means of communication used to avoid a situation of glare.

In a specific embodiment, the control unit further comprises:
an infrared transmitter capable of periodically transmitting data over a communication channel having a first IR beam;
sensing means for sensing IR radiation within a cone that is narrower than the cone of said first IR beam;
processing means for processing the signal representative of the IR information being sensed and detecting the presence of a second lamp emitting an IR signal;
means for significantly reducing the power generated the light sources—and particularly the LED diodes—in response to the detection of a counterpart lamp transmitting data over the IR channel.

In a preferred embodiment, the portable lamp comprises a wide beam and a narrow beam, the narrow beam being significantly reduced in response to the detection of a counterpart lamp transmitting over the IR channel. Alternatively, the portable lamp can include one or more off-axis beams which can be controlled differently.

In a particular embodiment, the control unit preserves the infrared emission at the expense of visible light beams at the end of battery life so as to extend the protection of the lamp holder against glare situations.

Preferably, the lamp will also include configuration means, especially after in accordance with one or more predetermined profiles, the configuration being performed by means of a USB port allowing communication with a computer, a touch pad or smartphone.

The invention is particularly adapted to the realization of a headlamp.

In another embodiment, the invention achieves a communication device to be positioned on the head of a user or on a portable lamp carried by that user. The device also includes communication means with a portable lamp so as to protect its holder against dangerous glare exposures.

Finally, the invention also achieves a process for controlling the power generated by a portable lamp comprising a light source with one or more sources (halogen, LED, OLED etc. . . . ) which generates at least one light beam. The portable lamp comprises means for transmitting and receiving an IR channel, the receiving cone of said channel being being narrower than the cone of the transmitting beam.

The method comprises the steps of:
transmitting a frame of information on said IR channel;
receiving an IR signal captured on said narrow receiving cone;
detection of an IR signal corresponding to a signal emitted by another lamp which emits on said IR channel;
reduction of the power of the source light in response to the detection of another lamp emitting on said IR channel.

BRIEF DESCRIPTION OF THE DRAWINGS

Other features, objects and advantages of the invention will become apparent upon reading the following description and drawings below, given by way of non-limiting examples. In the accompanying drawings.

DESCRIPTION

It will now be described how one can significantly improve the operation of a portable lamp, such as a headlamp, a torch or any mobile device fitted with an autonomous lighting system, incorporating for instance "reactive" or "dynamic" regulation system, comprising:

- any light source, for example with one or more LEDs, but also more generally of any light source (halogen lamp, OLED etc. . . . )
- means for controlling the brightness of LEDs in response to control information generated by a control unit.

The control unit includes a sensor generating a signal representative of reflected light and processing means for processing the signal in order to generate the control information. Usually a photo sensor of the type single-sensor can be used. Generally speaking, the single sensor may be any sensor that is capable of generating a basic analog or digital information, with the exception of an image sensor which generates an image structured into a matrix of pixels, and which is subject the aforementioned patent application. The photosensor clearly shows the advantage, compared to an image sensor, of achieving low costs manufacturing for the consumer market.

The lamp further comprises communication means, in particular on an infrared channel that is distinct from the light channel, for exchange, with another portable lamp, identification data, configuration parameters and/or control instructions. Alternatively, one may consider the use of a communication channel that is conveyed through the modulation of the visible light, or even any other means of wireless communication.

In a particular embodiment, the means of communication used to avoid a situation of glare.

Clearly, those are non-limiting examples and a skilled man can adapt the invention to other lighting devices to increase operational safety.

A. A First Embodiment Comprising Two Beams, Respectively Wide and Narrow

Figure 1:
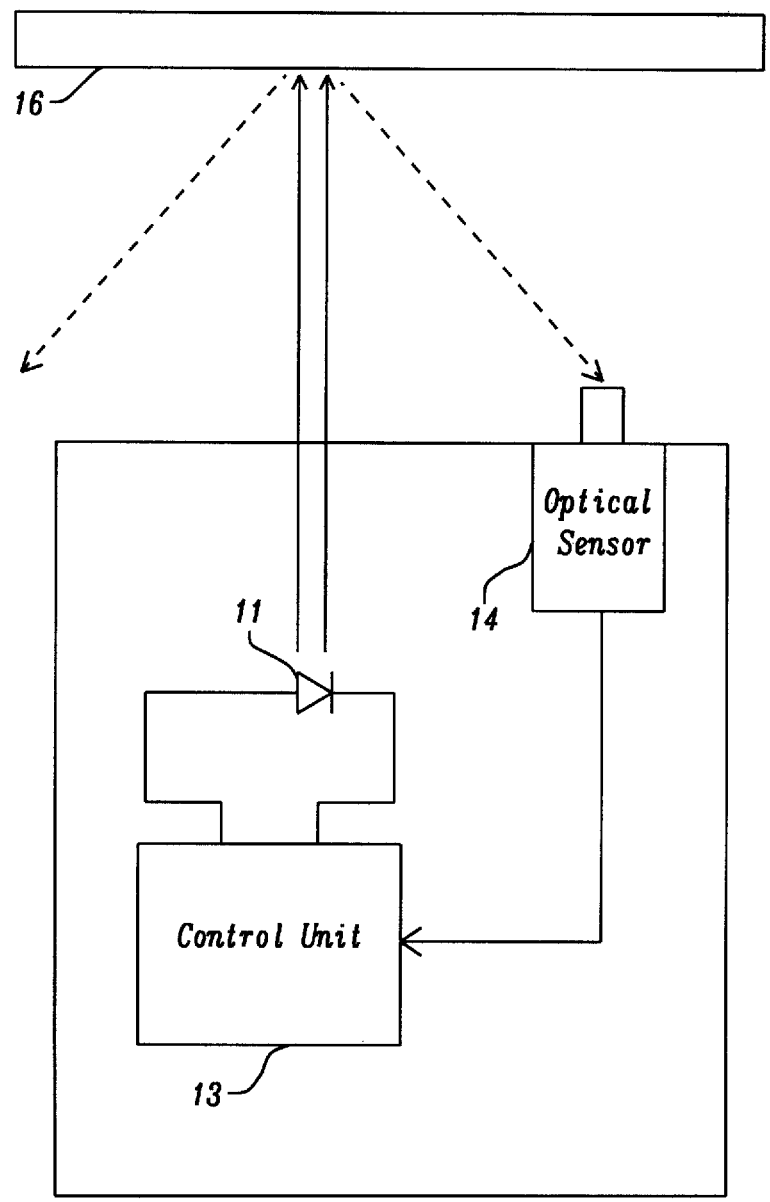
FIG. 1 illustrates the general architecture of a prior art conventional dynamic lighting lamp.
Figure 2:
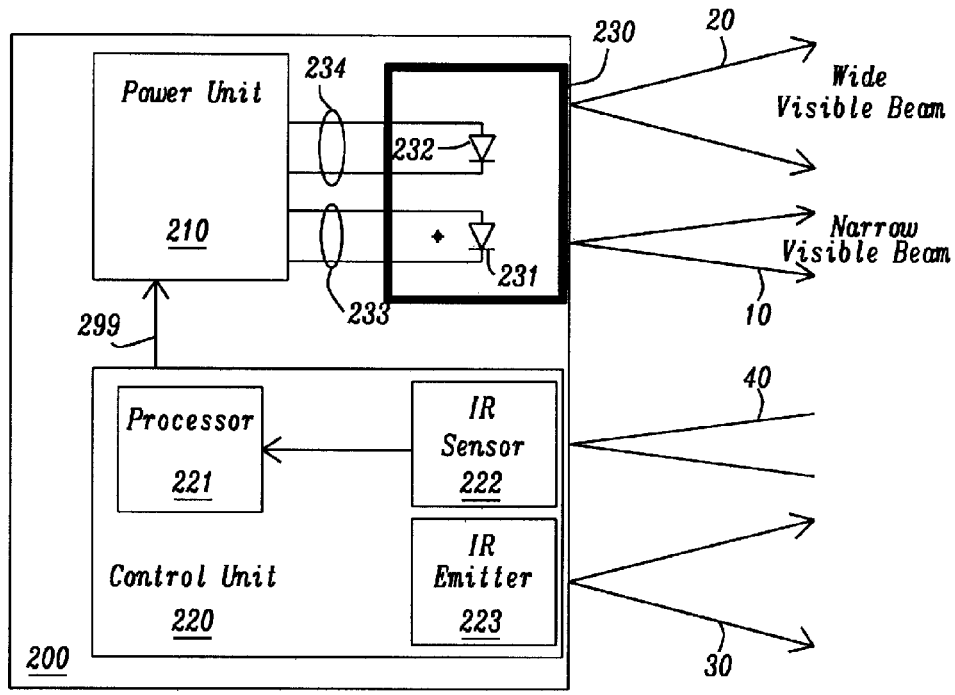
FIG. 2 illustrates a synoptic view of a first embodiment, comprising two beams, respectively wide and narrow.

FIG. 2 illustrates the general architecture of a first embodiment of a lamp 200—assumed to be a headlamp—having a reactive or dynamic regulation of the intensity of the light generated by two beams 10 and 20, respectively narrow and wide. The lamp 200 includes a power unit 210 associated with a control unit 220 and a lighting unit 230 comprising a plurality of light emitting diode LED, each one being fitted with its own focal system.

In the example of FIG. 2, there is shown, in order to simplify the description, a set of two diodes 231 and 232, respectively, fitted with their supply terminals 233 and 234 connected to the power unit 210. More generally, one can arrange, for the purpose of increasing the brightness of the lamp, a greater number of diodes in a single focal optical system and even arrange a higher number of optical systems for increasing the usability of the lamp.

In a specific embodiment, LED diodes 231 and 232 are respectively powered via circuits 233 and 234 under the control of a control information or control signal 299 generated by the control unit 220.

The power unit 210 specifically includes all the components that are conventionally found in an LED light lamp for the purpose of producing a light beam of high intensity, and generally based on Pulse Width Modulation PWM, which is well known to the skilled man and which is similar to what is known in the Class D audio circuits. Such PWM modulation is controlled by means of a control signal 299. In general, it should be noted that the term "signal" mentioned above refers to an electrical quantity—current or voltage—used for controlling the power unit, and in particularly the PWM modulation used for powering LED diodes 231 and 232. This is however only a non limiting example, and it is possible to replace the "control signal 299" by a "control information", eg logical information that can be stored in a register or in memory and thus transmitted by any appropriate means to control unit 100 to produce the corresponding luminous flux. In one particular embodiment, one may even consider that both control unit and power unit are integrated into a single module or integrated circuit.

One skilled in the art will readily understand, therefore, that when we refer to a "control signal 299", one equally encompasses the embodiments based on an electric control variable—current or voltage—as well as embodiments in which the control is performed by means of a logic information conveyed to the power unit. For this reason, we will discuss below indiscriminately control signal or control information.

In general, the components that make up the power unit 210—switches and circuits—are well known to those skilled in the art and the description will be deliberately reduced in this regard for the sake of conciseness. Similarly, the reader is referred to the general literature on various aspects of the PWM modulation.

A more specific example of the power unit will be described with more details in connection to FIG. 6.

Referring again to FIG. 2, one sees that control unit 220 comprises a photosensor 222, whose axis is parallel to the axis of the LED 231 and 232, which photo sensor generates a signal representative of the radiation being sensed, including reflective environment, to a processor 230 which performs signal processing on the latter.

The control unit further comprises an infrared transmitter 223, having a relatively wide collimation system—illustrated by the beam 30 of FIG. 2—and capable of periodically transmitting a data stream via an infrared communication.

The control unit also includes an infrared (IR) receiver for receiving an infrared signal supporting an infrared communication which can be established with another partner headlamp located vis-à-vis.

In one embodiment, that shown in FIG. 2, the same sensor 222 is used without distinction for sensing the visible radiation of the reflective ambient environment and the received infrared beam received from a possible partner lamp.

Alternatively, one may have two separate sensors, one sensor for the visible light (from the reflective ambient environment) and one further sensor which is more specifically dedicated to the reception of infrared radiation from a partner lamp. This variant has the advantage of allowing specific collimation system respectively arranged for the infrared beam and for the visible beam. It is to be understood that the particular collimation system used for infrared radiation— represented by the narrow beam 40—will be narrower than the beam associated with the infrared transmitter.

Therefore, if one wishes to have a wide beam to capture visible light, it may be appropriate to separate the two visible and infrared sensors (contrary to what is shown in FIG. 2), in order to organize a very narrow cone for infrared reception.

According to the embodiment of FIG. 2, the signal which is sensed by photosensor 222, or at least the visible component with respect to the embodiment of FIG. 2, is subject of an adequate signal processing by processor 221 within control unit 220, after conversion into digital thanks to an appropriate A/D converter (not shown in FIG. 2).

For this purpose, the processor may be required to perform various treatments in series or parallel, of the digital representation of the signal generated sensor 222, and in particular, adequate filtering operations, statistical calculation, demodulation, coding/channel decoding used for rendering the communication more robust with regard to the noise etc. . . . So as to decode a frame of data received from a partner lamp, or a communication partner device initiating a communication with the lamp. Such operations are well known in the field of signal processing, especially when it comes to isolate one particularly component of a signal, which is likely to carry a digital information, and it will not be necessary to weigh the presentation of the description.

According to the digital processing carried out by the signal processor, but also the decoding information received from a potential partner lamp, processor 221 is able to generate a control information on link 299 to the power unit.

With the possibility of controlling, separately, the light beams generated by LED 231 and 232, respectively on the narrow and wide beams.

In general, several strategies can be considered for power unit 210.

In a first embodiment, the infrared communication is intended for the transmission of a data frame, properly formatted and modulated on the IR signal transmitted by the IR emittor, and uniquely identifying the portable lamp.

Alternatively the data frame conveyed on the infrared channel also comprises, I,n addition to the identifier of the lamp, configuration parameters to be exchanged between the two partner lamps, and even control instructions for operations to be performed within the lamp.

In this way, two lamps facing in "vis-a-vis" can exchange data, receive instructions and, more generally, can update their configuration parameters and internal procedures based on the data communicated.

Multiple new possibilities and functionalities are thus allowed.

Figure 4:
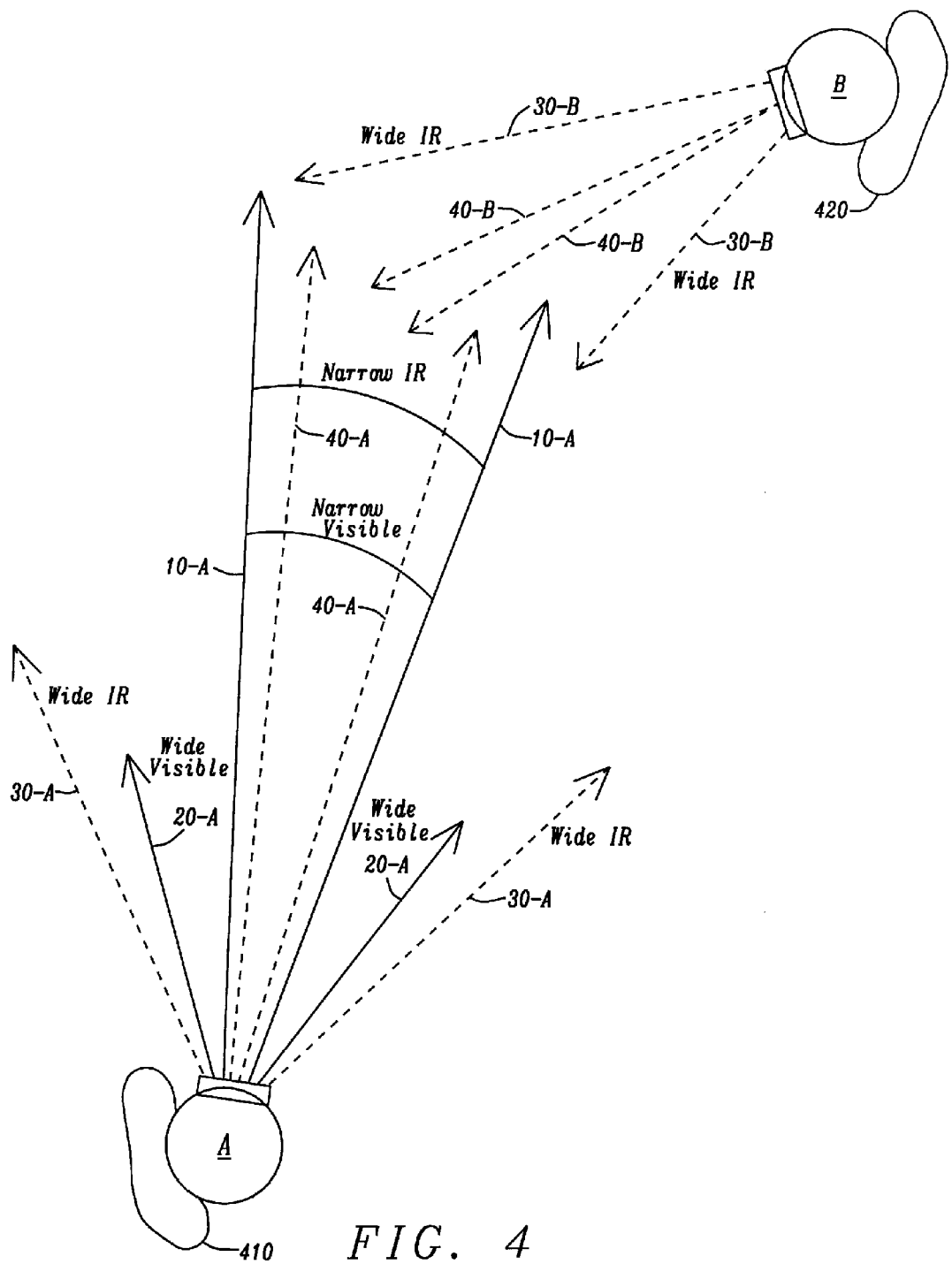
FIG. 4 is a simulation of the headlamp of FIG. 2 to illustrate the operation of the control process.

In connection with FIG. 4, we now describe a specific example of a new feature that is permitted, and that is the establishment of an anti-glare most useful for carrying the lamp mechanism.

Referring to FIG. 4, one will now describe one specific new functionality, consisting in anti glare system which is most useful for the lamp holder.

FIG. 4 illustrates, very schematically and in top view, two users A and B, respectively referenced 410 and 420, which may be in a position vis-à-vis. The head of each user is represented by a circle, carrying a corresponding headlamp.

For the sake of clarity, the numerical references of FIG. 2 have been reused in FIG. 4 for representing the different beams, light and infrared, wide and narrow.

It can be seen that holder A 410, who is likely to look to holder B 420, carries a headlamp generating with two visible beams 10-A and 20-A (respectively narrow and wide), a wide infrared beam IR-A 30-A and senses a possible infra red beam IR with a narrow collimation—as represented by the cone 40-A.

Symmetrically, holder B 420, who also carries a headlamp according to the present to invention, generates two visible beams (but not shown in the figure to increase legibility), a wide infrared beam IR 30-B and senses a possible infra red beam IR with a (narrow) collimation cone 40-B.

By construction, the lamp is designed so that the receiving cone of the infrared beam sensed by the sensor 222 is narrower than the beam emitted by the IR emitter 223.

According to one embodiment, control unit 220 of the subject A controls a significant reduction in the light produced by the lamp when the IR sensor 222 detects on its narrow reception cone 40-A, an infrared flux IR which, when properly demodulated, decoded etc. . . . , shows the presence of a headlamp partner.

In a particular embodiment, the control unit 220 only controls the switch-off, or at least a significant reduction of the power of the narrow beam which might expose subject B to uncomfortable or dangerous glare.

Figure 5:
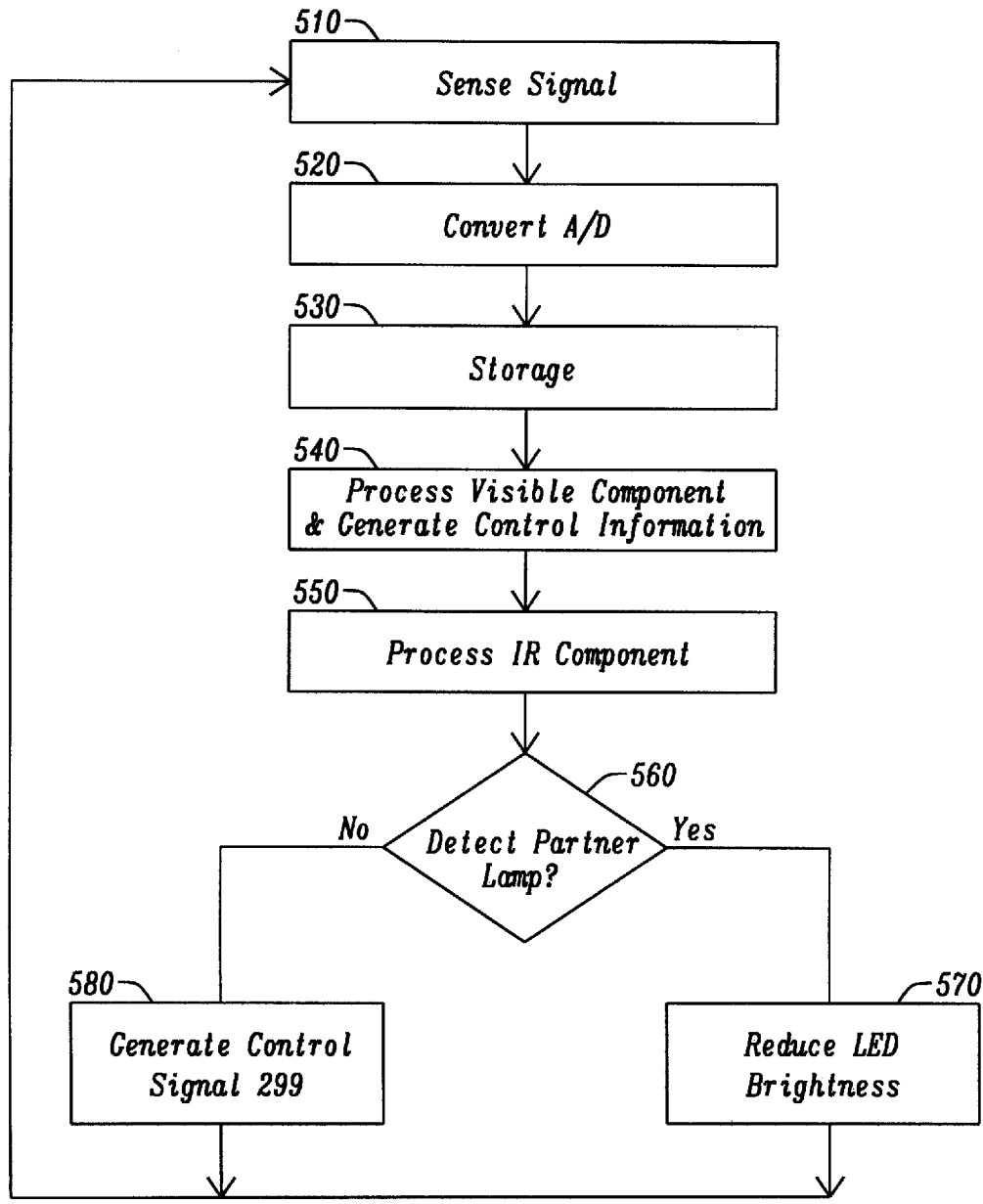
FIG. 5 illustrates an embodiment of a communication process of a headlamp according to one embodiment.

FIG. 5 more particularly illustrates the process used in the embodiment of FIG. 2, wherein one single sensor 222 achieves simultaneous sensing of both the infrared and light beams.

In step 510, the process proceeds with a periodical capturing of the signal generated by the sensor 222.

In a step 520, the signal is converted into a digital representation that is stored in memory.

Then in a step 530, processor 221 performs a processing on the information stored in memory, and in particular on the visible component of the light reflected and sensed by the sensor 222. Such processing can include multiple processing operations, in particular filtering or statistical calculation (averaging etc. . . . ).

Then, in a step 540, processor 221 calculates, from the result of processing performed on the visible component in step 530, control information to be transmitted to power unit 210 via the control signal 299 and particularly respectively defining the power of emission of both narrow and wide beams.

Then, in a step 550, processor performs a more specific processing of the infrared component of the signal sensed by sensor 222 (or specific IR sensor when applicable) for the purpose of filtering, amplifying, demodulating, and decoding the information if received via infrared communication channel (IR).

It is the completion of this step 560 that a partner headlamp can potentially be detected by processor 221.

In a step 560, processor 221 performs a test to determine whether such a partner headlamp has been detected, in which case the process continues with a step 570, where a significant reduction of the light power generated on at least one of the beams 10 and 20, and especially narrow beam 10, is performed.

If no partner lamp has been detected, then the process proceeds with a step 580 in which the result of step 540, namely, the control information calculated from the processing of the visible beam, is applied and transmitted the power module 210 via the link 299 in order to apply as is the "dynamic" or "reactive" regulation.

The process then returns to step 510 to perform the processing of a new sample of the signal sensed by sensor 222.

As seen with the process of FIG. 5, processor 221 can correct the conventional "dynamic" or "reactive" regulation by significantly reducing the generated light beam when a partner lamp enters within the field corresponding to the narrow beam of the infrared channel.

This results in a process for regulating the light power which is much more efficient, since it simultaneously takes into account the "visible" information sensed or captured by sensor 222, and corresponding to the response of the reflected ambient environment, but also information forwarded via the infrared communication channel, so as to apply possible configuration or processing instructions and, foremost, to avoid glare to the holder of the partner lamp.

Indeed, when processor 221 detects, on the narrow reception cone of the IR sensor, the presence of a partner headlamp, the same processor controls a significant reduction of at least one of the light beams.

Thanks to such particularly advantageous detection, it is the headlamp of holder A which "senses", within its IR narrow reception cone, the presence of a partner lamp—owned by Holder B—emitting light on a wider beam—which also decreases the brightness. Even if, in addition, the control system of the lamp B did not detect the presence of light A.

Indeed, the holder B who is most exposed to potential glare is the particular person whom the holder A looks and who, in particular, receives the narrow visible beam produced by holder A. It would be enough that holder B turns his/her head towards holder A to be highly and dangerously dazzled. The reverse is not true, it is not enough to turn the head of A to be dazzled because B does not look at him/her.

By doing so asymmetrically, by reducing the brightness of the light generated by a lamp when the latter detects a signal transmitted by a partner lamp, it becomes possible to significantly reduce the risk of glare while maintaining an efficient lighting for each user.

It should be noticed that the reduction of the light intensity which is applied in step 570 is only one particular non limiting example.

In a specific embodiment, the control unit of the headlamp comprises an arbitration system for preserving the powering of the IR emission system while suspending the powering of one or more of the visible beams, when the powering voltage falls below one predetermined threshold. Thus, the holder of the lamp can be assured to continuously take advantage of the protection of "his/her" system of anti-glare protection even though the battery or the battery is nearly completely discharged.

In another specific embodiment, an IR transmitter to be combined with any generic lamp is achieved, for allowing, here also, protection of the holder of the generic lamp against glare from other lights. To achieve this, one can simply remove from the example examples described above all components that are related to the generation of visible beams, and only consider the "control" part of the described examples, together with the combination of the IR emitter 223 and the sensor/sensor IR 222.

B. A Second Embodiment of a Lamp Having Two Unaligned Axis

Figure 3:
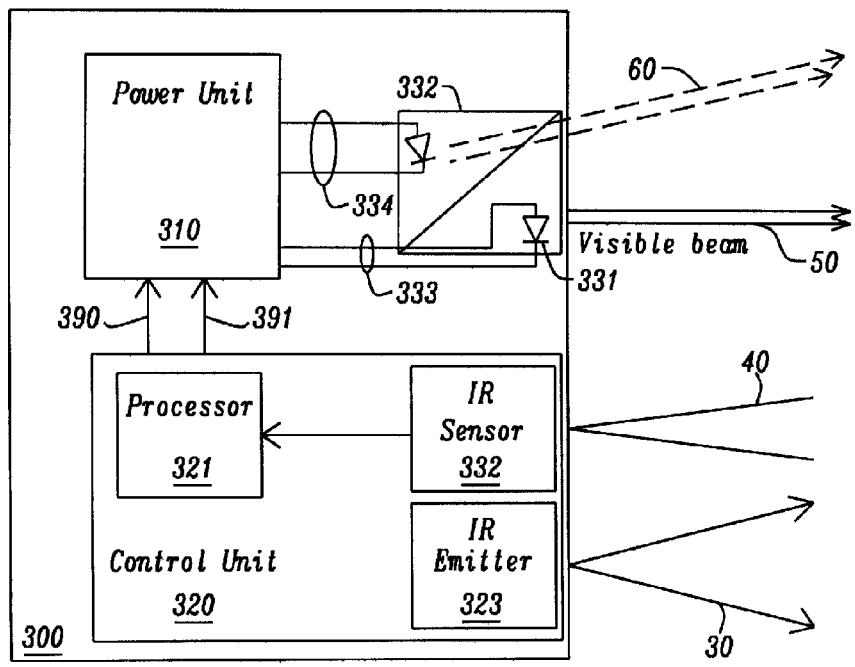
FIG. 3 illustrates a second embodiment comprising two off-axis beams.

FIG. 3 illustrates one particular alternative of embodiment of FIG. 2, in which one replaces unit 230 of the first embodiment, by a set of two series LED diodes having slightly different axes. As it can be seen in the figure, a first set of diodes (only one diode LED 331 is shown) generates a first beam having an axis 50, while a second set of diodes (only one LED 332 being shown) generates the second beam along an axis 60. The two series of diodes 331 and 332 are powered by means of a power unit 310, similar to the unit 210 of FIG. 2, respectively via wires 333 and 334 being also controlled by control unit 320.

If FIG. 3 illustrates one embodiment with only two series of diodes and hence two axes 50 and 60, it is clear that a man skilled in the art can adapt the invention to produce a greater number of light beams with various geometrical arrangements.

In the embodiment of FIG. 3, one observes that the control unit 320 generates two control information or control signals, respectively 390 and 391, which are intended to control the power of emission of corresponding LED, ie LED 331 and 332.

Again, as in the first two embodiments described above, it is a digital processing of the signal generated by 322, sensing the two visible and IR beams, which allows the generation of the control information or control signals 390 and 391.

It will now be described with reference to FIG. 6, a more specific embodiment wherein the power unit 210 includes a battery (not shown in the figure), which generates a supply voltage Vcc and two power switches, respectively 121 and 122, for supplying current to the LED diodes 232 and 231 via their respective circuits 234 and 233 implementing the PWM modulation. Switches 121 and 122 are for instance semiconductor type switches, of the type bipolar transistors, FET (Field Effect Transistor) or MOSFET (Metal Oxide Semiconductor).

Both circuits 233 and 234 are respectively controlled by the control information or control signals 113 and 114 generated by an integrated control unit 500 integrated in the control unit 220.

Figure 6:
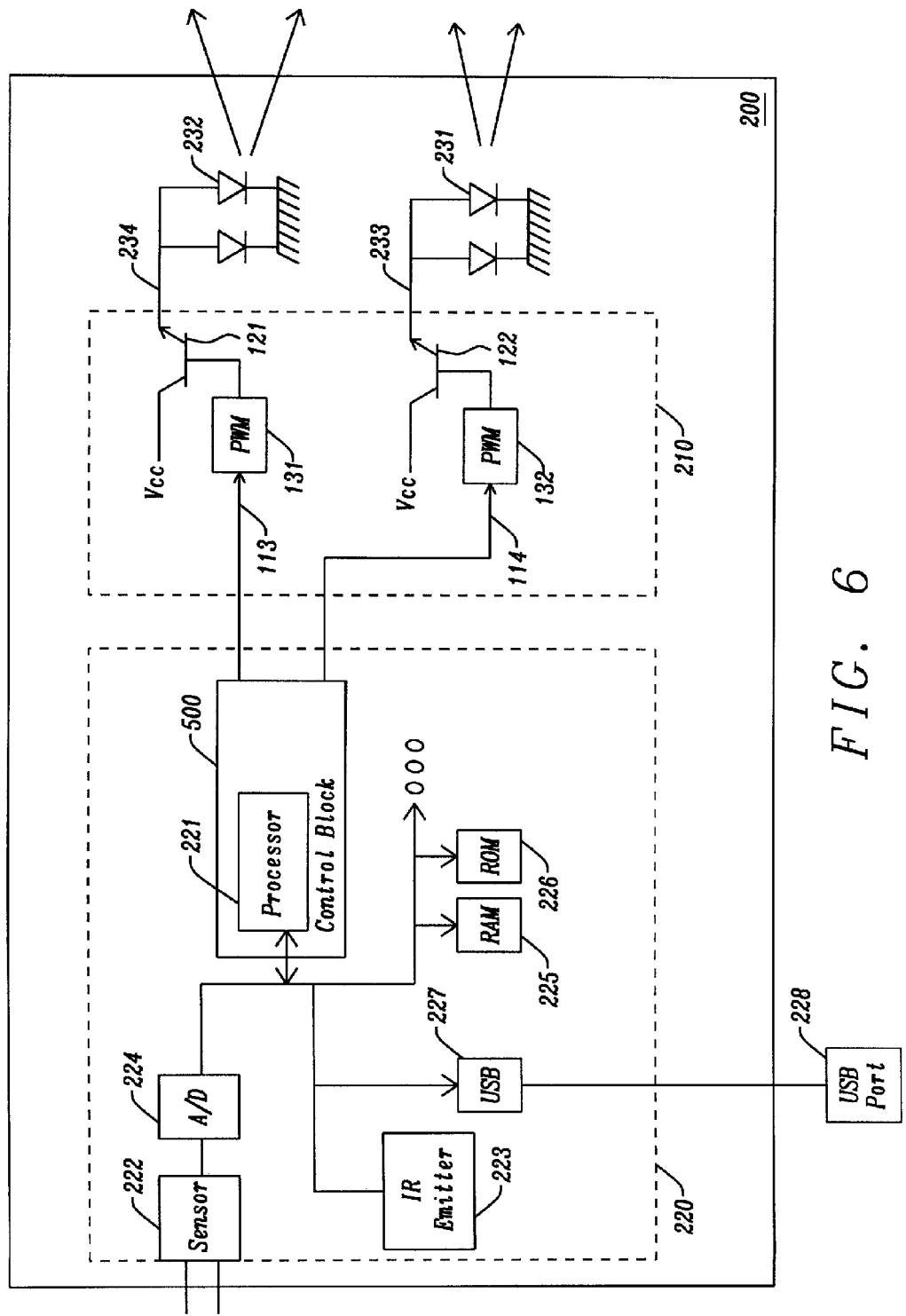
FIG. 6 shows a third embodiment based on a microprocessor architecture.

Control unit 500 includes a processor 221 communicating via conventional address data and control busses with a RAM memory 225, ROM or EEPROM memory 226 . . . etc As an illustration, sensor 222 being shown in FIG. 6 is an analog sensor, operating in both the visible and infra-red fields, and associated with an analog/digital converter for converting the analog signals into digital information that can then be made available to processor 221 via the data bus, address etc. . . .

In a particular embodiment, one may consider embedding the two functions of IR capture and signal processing into a single integrated circuit incorporating the two functions so as to allow adequate miniaturization.

In another embodiment, a USB port 280 is accessible via a USB module 270 which is included in the control unit and connected to the bus, allowing the exchange of data according to the USB standard. Specifically, the USB interface will allow, as this will be seen below, the storage of settings parameters and profiles within the lamp.

In this way, the control unit can communicate with a data processing device such as a computer, a laptop, a touch pad, a personal assistant and even a smartphone It should be noted that the USB port is only one illustrative example of a means for achieving communication between the lamp and a computer, and a skilled person may consider any other communication means, including wireless communication means (Bluetooth, wifi etc. . . . ). In one particular embodiment, the headlamp will be arranged with its own IP (Internet Protocol) address so as to allow easy configuration, for instance through a dedicated web server.

Such communication is particularly advantageous, for instance for exchanging configuration data and settings, such as "profiles" that can serve for storing and selecting, as necessary, the settings of the lamp in accordance with the desired use wished by its owner, and in particular for executing the diverses regulation strategies and/or achieving specific functionalities based on instructions received via the infrared channel.

One will thus be able, in accordance with the profiles, to activate diverse specific procedures or modes, such as a so-called static mode (wherein the regulation process is deactivated), a dynamic mode (activation of the regulation), a IR "master" communication mode, a IR "slave" communication mode etc. . . .

Once the lamp is configured, one can even, during its operation, modify certain procedures, perform some operations, even making the reconfiguration of the lamp thanks to the possibles instructions which can be received from other devices and lamps, and transmitted via the infrared channel.

Opening the possibility of a wide number of new functionalities.

In particular, one can consider different configuration profiles for the described lamp, including the possibility of configuring the lamp either in a mode "master" or "slave". A lamp which is configured into the so-called "master" mode could be used for amending the configuration or for controlling the execution of an instruction by any other lamp which would have been configured in a mode "slave".

Thus, it is possible to easily set up a group of lamps belonging to a group of users which, fastly and automatically, could be configured on the same setting.

As it can be seen, there are a multitude of possibilities offered by the embodiments of the new headlamps.

And which go well beyond the single issue of anti-glare exposition.

What is claimed is:

1. Portable lamp wherein it comprises communication means for exchanging, with at least another partner portable lamp, identification or configuration data or control instructions, wherein said communication means are used for anti-glare function and wherein the lamp further comprises:
    an IR emitter for periodically emitting data over an IR channel having a first IR beam; and a control unit which comprises:
    sensing means for sensing an IR radiation within a receiving cone which is narrower than said first beam;
    processing means for processing the signal representative of the IR information being sensed and for detecting the presence of a second lamp that emits an IR signal;
    means for significantly reducing the power generated by said lamp in response to the detection of said partner portable lamp emitting data over the IR channel.

2. Portable lamp according to claim 1, comprising:
    at least one light source allowing the generation of at least one light beam;
    a power unit for powering and controlling the brightness of the light in response to control information or a control signal;
    wherein said control unit generates said control information or said control signal, said control unit comprising a sensor for generating a signal that is representative of a reflected light and means for processing said signal for generating said control information or control signal.

3. Portable lamp according to claim 2, wherein said control unit comprises means for switching off said at least one light beam while keeping activated said first IR beam at the end of life of the battery.

4. Portable lamp according to claim 1 further comprising a wide beam and a narrow beam, the power of the narrow beam being significantly reduced in response to the detection of said partner portable lamp emitting on said IR channel.

5. Portable lamp according to claim 1 further comprising one or more unaligned beams which can be controlled differently.

6. Portable lamp according to claim 1 wherein said control unit comprises means for transmitting data over said IR channel, said data defining a lamp identifier, but also instructions defining operations to be executed or configuration settings to be exchanged with other lamps.

7. Portable lamp according to claim 1 further comprising configuration means, in particular according to one or more predetermined profiles, said configuration being performed by means of a communication port of the type USB port allowing communication with a computer, a touch pad or a smartphone.

8. Portable lamp according to claim 1, wherein said IR channel is used for the transport of identification data and/or configuration settings and/or control instructions dedicated to said partner portable lamp.

9. Portable lamp according to claim 1 wherein it is a headlamp comprising LED type diodes.

10. Portable lamp according to claim 1 further comprising a communication device to be located on the head of a user or to be associated with said portable lamp for a user, and comprising communication means for communication with said partner portable lamp, so as to control, in a situation of vis-a-vis, the reduction of the brightness of the light generated by said partner portable lamp.

11. Process for controlling the power of the light emitted by a portable lamp comprising a light source allowing the generation of at least one light beam, said portable lamp further comprising means for emitting and receiving data over an IR channel, a receiving cone of said IR channel being narrower than the cone of an emitting beam;
    and comprising means for controlling said process with a control unit;
    the process comprising the following steps:
        emitting a frame of data through said IR channel;
        receiving a IR signal detected on said receiving cone;
        detecting a IR signal corresponding to a signal emitted by another lamp emitting on said IR channel;
        reducing the power of the light of said portable lamp in response to the detection of said another lamp emitting on said IR channel.

12. The process for controlling the power of the light emitted by a portable lamp according to claim 11 further comprising a wide beam and a narrow beam, the power of the narrow beam being significantly reduced in response to the detection of said another lamp emitting on said IR channel.

13. The process for controlling the power of the light emitted by a portable lamp according to claim 11 further comprising one or more unaligned beams which can be controlled differently.

14. The process for controlling the power of the light emitted by a portable lamp according to claim 11, wherein said control unit comprises means for switching off said at least one light beam while keeping activated the IR signal at the end of life of the battery.

* * * * *